UNITED STATES PATENT OFFICE.

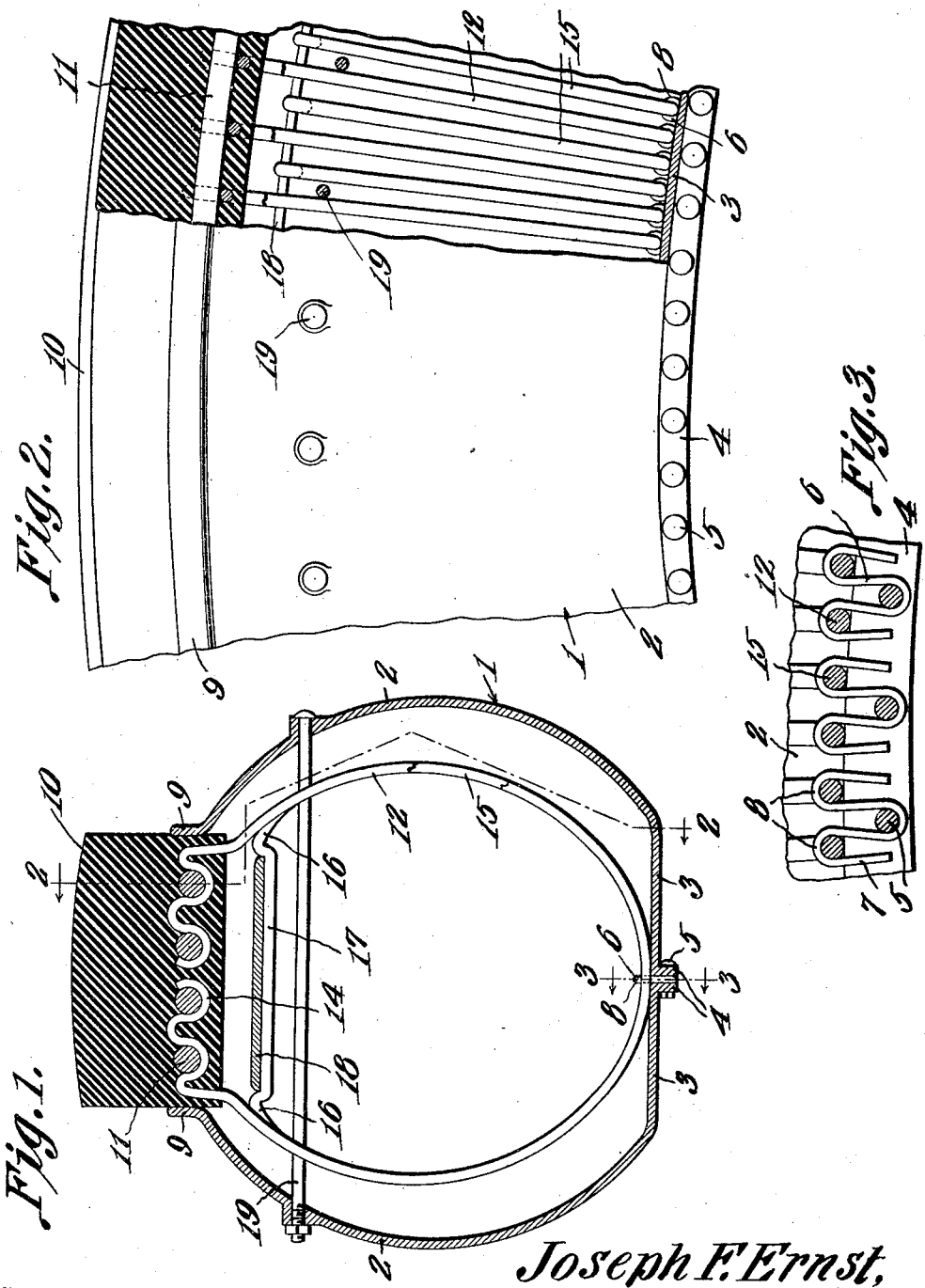

JOSEPH F. ERNST, OF MINNEAPOLIS, MINNESOTA.

SPRING-TIRE.

1,120,801.  Specification of Letters Patent.  Patented Dec. 15, 1914.

Application filed November 29, 1913. Serial No. 803,749.

*To all whom it may concern:*

Be it known that I, JOSEPH F. ERNST, a citizen of the United States, residing at Minneapolis, in the county of Hennepin and State of Minnesota, have invented a new and useful Spring-Tire, of which the following is a specification.

The device forming the subject matter of this application is a tire adapted to be employed upon automobiles and other vehicles.

One object of the present invention is to provide a tire of the type above indicated in which pneumatic tires and other elements subject to puncture may be dispensed with.

Another object of the invention is to provide, in a device of the type mentioned, a plurality of springs which coöperate in a novel manner with each other and with the tread to support the tread.

The invention aims to provide novel means whereby the resilient supports which uphold the tread may be connected with the casing which receives the tread slidably.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 is a cross section; Fig. 2 is a section partly on the line 2—2 of Fig. 1; Fig. 3 is a section on the line 3—3 of Fig. 1.

The tire constituting the subject matter of this application comprises a casing denoted generally by the numeral 1. The casing 1 is a resilient structure and may be fashioned from metal. The casing includes trough-shaped members 2 having alined, flat base portions 3 adapted to coöperate with the rim of the wheel (not shown). Along their edges, the base portions 3 of the parts 2 of the casing 1 are provided with projecting flanges 4 united by securing elements 5 which may be rivets, bolts or the like. Located between the flanges 4 and engaged with the securing elements 5 are clips 6 comprising arms 7 which project between the flanges 4, toward the center of the wheel, the clips including loops 8 which lie within the contour of the casing 1 and project beyond the base portions 3. The free edges of the members 2 of the resilient casing 1 are formed into approximately parallel feet 9. Slidably received between the feet 9 is a tread 10 which may be fashioned from any suitable substance. If desired, the tread 10 may consist of hard rubber and canvas, but this detail is immaterial. Located within the tread 10 and extended circumferentially of the same are reinforcing elements 11. There may be any number of these elements 11, and if desired the same may be in the form of rods.

Disposed transversely of the casing 1, and the tread 10 are arched or U-shaped primary supports 12. The ends of the arched supports 12 are formed into arms which project toward each other and enter the tread 10, the arms being bent upon themselves or otherwise formed to fashion seats 14 in which the reinforcing rods 11 are received, all of which will be understood readily from Fig. 1.

Alternating with the arched primary supports 2 are secondary supports 15 which preferably are continuous or of loop-shape. Throughout the major portion of their extents, the secondary supports 15 are alined with the primary supports 12, but adjacent the tread 10, the secondary supports are bent somewhat abruptly, as indicated at 16 toward the median plane of the tire and between these curved portions 16, seats 17 are formed in the secondary supports. A strap or band 18 is engaged in the seats 17. The supports 12 and 15 abut against the base portions 3 of the casing 1 and are held thereon by the loops 8 of the clips 6. Securing devices which may be bolt and nut structures 19 connect opposed portions of the casing 2 and pass between certain of the supports 12 and 15.

When the tire herein disclosed is under compression, the tread 10 in the first instance will move inwardly and put the primary supports 12 under compression. Under excessive strain, the tread 10 will engage with the strap or band 18 and thus the secondary supports 15 will be put under compression. Finally, under an extreme compression, the strap or band 18 will engage the securing devices 19, and thus the strain will be carried into the resilient casing 1.

In practice, all parts of the structure, saving perhaps the tread 10, are fashioned from metal.

Having thus described the invention, what is claimed is:—

1. In a device of the class described, a base; a tread; arched supports engaged with the base, portions of the supports being completely embedded in the tread within the contour of the tread to act as a transverse reinforcement therefor, said portions of the supports including seats forming interlocking elements with the tread; and longitudinal reinforcements lying within the contour of the tread and lodged in the seats against transverse movement.

2. In a device of the class described, a base; an arched support engaged with the base and including a sinuous portion completely embedded in the tread within the contour of the tread and extended transversely of the tread to act as a reinforcement therefor; and a longitudinal reinforcement embedded in the tread and lodged in the sinuous portion of the support against transverse movement.

3. In a device of the class described, a casing comprising coöperating members provided along their inner edges with flanges; a tread slidable between the outer edges of said members; a spring coöperating with the tread to support the same; a securing element uniting the flanges; and a clip through which the spring and the securing element pass.

4. In a device of the class described, a casing; a tread mounted between opposed portions of the casing; arched primary and secondary supports disposed transversely of the tread and resting upon the casing, the supports being disposed in alternating relation circumferentially of the tread, the primary supports being provided with seats embedded in the tread and the secondary supports being provided with seats spaced from the intrados of the tread; a band extended transversely of the secondary supports and engaged in the seats thereof; securing devices connecting opposed portions of the casing and passing between certain of the supports, the band passing across the securing devices; and a reinforcing element located in the tread and engaged in the seats of the primary supports.

5. In a device of the class described, a resilient casing; a tread coöperating with the casing; arched primary and secondary supports located within the casing, the primary supports being engaged with the tread and the secondary supports being spaced from the tread; a band connected with the secondary supports; and a securing device connecting opposed portions of the casing and located inwardly of the band; the primary supports being adapted to yield to permit the tread to come into contact with the band, and the secondary supports being adapted to yield to permit the band to come into contact with the securing devices.

In testimony that I claim the foregoing as my own, I have hereto affixed my signature in the presence of two witnesses.

JOSEPH F. ERNST.

Witnesses:
R. C. McFarland,
A. W. Pauly.

Copies of this patent may be obtained for five cents each, by addressing the "Commissioner of Patents, Washington, D. C."